(12) United States Patent
Liu et al.

(10) Patent No.: US 12,157,058 B2
(45) Date of Patent: Dec. 3, 2024

(54) INTERACTION INFORMATION PROCESSING METHOD AND APPARATUS, TERMINAL, AND STORAGE MEDIUM

(71) Applicant: TENCENT TECHNOLOGY (SHENZHEN) COMPANY LIMITED, Shenzhen (CN)

(72) Inventors: Peicheng Liu, Shenzhen (CN); Xiaohao Liu, Shenzhen (CN); Liyuan Zou, Shenzhen (CN); Wuyuan Xu, Shenzhen (CN); Qinghua Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 191 days.

(21) Appl. No.: 17/743,149

(22) Filed: May 12, 2022

(65) Prior Publication Data

US 2022/0266142 A1    Aug. 25, 2022

Related U.S. Application Data

(63) Continuation of application No. PCT/CN2021/125384, filed on Oct. 21, 2021.

(30) Foreign Application Priority Data

Dec. 11, 2020   (CN) .......................... 202011459769.1

(51) Int. Cl.
*A63F 13/537* (2014.01)
*A63F 13/56* (2014.01)
(Continued)

(52) U.S. Cl.
CPC ............ *A63F 13/56* (2014.09); *A63F 13/537* (2014.09); *G06F 3/04817* (2013.01); *G06F 3/04842* (2013.01)

(58) Field of Classification Search
None
See application file for complete search history.

(56) References Cited

U.S. PATENT DOCUMENTS

2008/0216022 A1  9/2008  Lorch et al.
2011/0250966 A1  10/2011  Ohara et al.
(Continued)

FOREIGN PATENT DOCUMENTS

CN    104216645 A    12/2014
CN    105094345 A    11/2015
(Continued)

OTHER PUBLICATIONS

The Japan Patent Office (JPO) Notification of Reasons for Refusal for Application No. 2022-571328 and Translation Aug. 28, 2023 6 Pages.

(Continued)

*Primary Examiner* — Damon J Pierce
(74) *Attorney, Agent, or Firm* — ANOVA LAW GROUP PLLC

(57) ABSTRACT

An interaction information processing method includes: displaying a battle interface of a multiplayer online game, the battle interface including a target virtual object (201); displaying an interaction icon presentation region in response to an icon presentation operation on the target virtual object, the interaction icon presentation region including at least one candidate interaction icon (202); receiving a selection confirmation operation on a target interaction icon in the at least one candidate interaction icon (203); and displaying, in the battle interface, interaction information corresponding to the target interaction icon at an interaction presentation position corresponding to the target virtual object (204).

14 Claims, 11 Drawing Sheets

(51) Int. Cl.
  *G06F 3/04817* (2022.01)
  *G06F 3/04842* (2022.01)

(56) References Cited

U.S. PATENT DOCUMENTS

| | | | |
|---|---|---|---|
| 2013/0065683 A1* | 3/2013 | Yoro | A63F 13/426 463/31 |
| 2014/0047361 A1 | 2/2014 | Gaspar et al. | |
| 2015/0005064 A1* | 1/2015 | Lee | A63F 13/87 463/31 |
| 2018/0028907 A1 | 2/2018 | Weng et al. | |
| 2021/0370177 A1 | 12/2021 | Li | |
| 2022/0203224 A1 | 6/2022 | Rao | |

FOREIGN PATENT DOCUMENTS

| | | | |
|---|---|---|---|
| CN | 105279417 A | 1/2016 | |
| CN | 111010585 A | 4/2020 | |
| CN | 111760267 A | 10/2020 | |
| CN | 111957032 A | 11/2020 | |
| CN | 112569611 A | 3/2021 | |
| JP | H11226250 A | 8/1999 | |
| JP | 2005192045 A | 7/2005 | |
| JP | 2008527563 A | 7/2008 | |
| JP | 2011118542 A | 6/2011 | |
| JP | 2014233366 A | 12/2014 | |
| JP | 2015009147 A | 1/2015 | |
| JP | 2018519970 A | 7/2018 | |
| WO | 2020168680 A1 | 8/2020 | |
| WO | 2020215978 A1 | 10/2020 | |

OTHER PUBLICATIONS

China National Intellectual Property Administration (CNIPA) Office Action 1 for 202011459769.1 Apr. 21, 2022 3 Pages (including translation).
The World Intellectual Property Organization (WIPO) International Search Report for PCT/CN2021/125384 Jan. 19, 2022 13 Pages (including translation).
The Japan Patent Office (JPO) Notification of Reasons for Refusal for Application No. 2022-571328 and Translation Feb. 26, 2024 6 Pages.
Korean Intellectual Property Office (KIPO) Office Action 1 for 2022-7018934 Apr. 29, 2024 13 Pages (including translation).
Kim Jihye (kjh@monawa.com), "Change the target designation method and get the exact damage!", http://www.hungryapp.co.kr/news/news_view.php?durl=YmNvZGU9 . . . , Apr. 27, 2017 (Apr. 17, 2017). 8 Pages (including translation).

* cited by examiner

INTERACTION INFORMATION PROCESSING METHOD AND APPARATUS, TERMINAL, AND STORAGE MEDIUM

CROSS-REFERENCES TO RELATED APPLICATIONS

This application is a continuation application of PCT Patent Application No. PCT/CN2021/125384, filed on Oct. 21, 2021, which claims priority to Chinese Patent Application No. 202011459769.1, entitled "INTERACTION INFORMATION DISPLAY METHOD AND APPARATUS, TERMINAL, AND STORAGE MEDIUM" filed on Dec. 11, 2020, the entire contents of both of which are incorporated herein by reference.

FIELD OF THE TECHNOLOGY

Embodiments of the present disclosure relate to the field of application development technologies, and in particular, to an interaction information processing method and apparatus, a terminal, a storage medium, and a program product.

BACKGROUND OF THE DISCLOSURE

In some multiplayer game battles, sometimes it is necessary to display some interaction information in a battle interface to increase fun of the game.

In the related art, a battle interface includes a chat control. A chat interface is displayed by clicking the chat control. A plurality of interaction icons are displayed by clicking an expression control in the chat interface. One of the interaction icons is clicked, and interaction information corresponding to the interaction icon is then displayed in the battle interface.

In the foregoing related art, to display the interaction information, it is necessary to set the chat control in the battle interface, and sequentially click the chat control, the expression control, and the interaction icon. The operation steps are cumbersome.

SUMMARY

Embodiments of the present disclosure provide an interaction information processing method and apparatus, a terminal, a storage medium, and a program product, which can simplify operation steps of displaying interaction information. The technical solutions are as follows:

According to an aspect of the embodiments of the present disclosure, an interaction information processing method is provided. The method is executed by a terminal and includes: displaying a battle interface of a multiplayer online game, the battle interface including a target virtual object; displaying an interaction icon presentation region in response to an icon presentation operation on the target virtual object, the interaction icon presentation region including at least one candidate interaction icon; receiving a selection confirmation operation on a target interaction icon in the at least one candidate interaction icon; and displaying, in the battle interface, interaction information corresponding to the target interaction icon at an interaction presentation position corresponding to the target virtual object.

According to an aspect of the embodiments of the present disclosure, an interaction information processing apparatus is provided. The apparatus includes: an interface display module, configured to display a battle interface of a multiplayer online game, the battle interface including a target virtual object; an icon presentation module, configured to display an interaction icon presentation region in response to an icon presentation operation on the target virtual object, the interaction icon presentation region including at least one candidate interaction icon; an operation receiving module, configured to receive a selection confirmation operation on a target interaction icon in the at least one candidate interaction icon; and an information display module, configured to display, in the battle interface, interaction information corresponding to the target interaction icon at an interaction presentation position corresponding to the target virtual object.

According to an aspect of the embodiments of the present disclosure, a terminal is provided. The terminal includes a processor and a memory. The memory stores at least one instruction, at least one program, a code set, or an instruction set, and the at least one instruction, the at least one program, the code set, or the instruction set is loaded and executed by the processor, to implement the interaction information processing method.

According to an aspect of the embodiments of the present disclosure, a non-transitory computer-readable storage medium is provided. The computer-readable storage medium stores at least one instruction, at least one program, a code set, or an instruction set, and the at least one instruction, the at least one program, the code set, or the instruction set is loaded and executed by a processor, to implement the interaction information processing method.

The technical solutions provided in the embodiments of the present disclosure may include the following beneficial effects:

Through the icon presentation operation on the battle interface of the multiplayer online game, the display of the candidate interaction icons can be triggered efficiently. Through the selection confirmation operation on the target interaction icon, the target interaction icon can then be quickly selected and the corresponding interaction information can be displayed. Compared with a case of finding and clicking a chat control, then finding and clicking an expression control, and then finding and clicking a target interaction icon to display corresponding interaction information, the present disclosure can simplify the operation steps of displaying the interaction information and improve the operation convenience.

It is to be understood that, the foregoing general descriptions and the following detailed descriptions are merely for illustration and explanation purposes and are not intended to limit the present disclosure.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with the present disclosure. On the contrary, the implementations are merely examples of methods that are described in detail in the appended claims and that are consistent with some aspects of the present disclosure.

Figure 1:
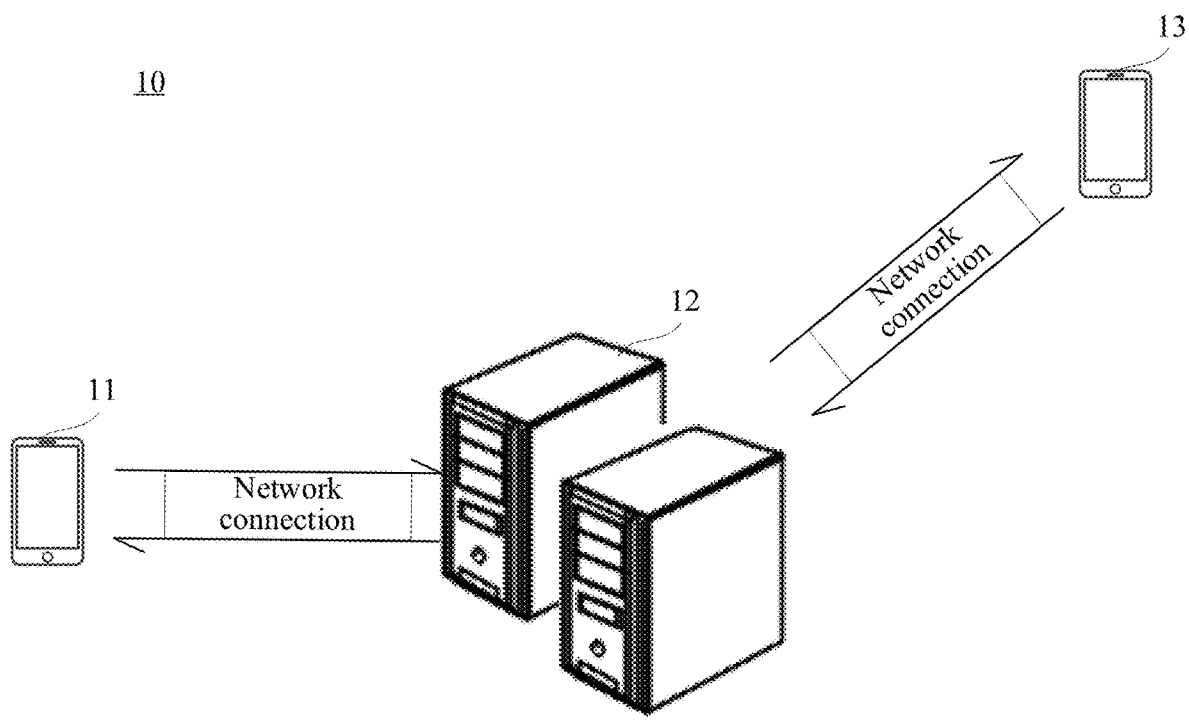
FIG. 1 is a schematic diagram of an implementation environment according to an embodiment of the present disclosure.

FIG. 1 is a schematic diagram of an implementation environment according to an embodiment of the present disclosure. The implementation environment may be implemented as an interaction information processing system. The system 10 may include a first terminal 11.

A target application, for example, a first client of the target application, is installed and run on the first terminal 11, and a first user account is logged in the first client. The target application may be a game application such as a shooting game application, a multiplayer gunfight survival game application, an escape survival game application, a location based service (LBS) game application, or a multiplayer online battle arena (MOBA) game application, which is not limited in the embodiments of the present disclosure. The target application may be alternatively any application with interaction information processing capabilities, such as social applications, payment applications, video applications, music applications, shopping applications, and news applications. In the method provided in the embodiments of the present disclosure, an execution entity of each step may be the first terminal 11, for example, the first client running in the first terminal 11.

In some embodiments, the first user account corresponds to a target virtual object, and the user of the first client can control the target virtual object and display information in a battle interface through a function provided by the target application. The virtual object is a virtual character controlled by the user through the target application. Using an example in which the target application is a game application, the virtual object is a game character controlled by the user through the game application. The virtual object may be in a human form, an animal form, a cartoon form, or the like, which is not limited in the embodiments of the present disclosure. The virtual object may be presented in a three-dimensional form or a two-dimensional form, which is not limited in the embodiments of the present disclosure. In some embodiments, the virtual object is in a virtual environment. When the virtual environment is a three-dimensional virtual environment, a first virtual character may be a three-dimensional model created based on the skeleton animation technology. The virtual object has its own shape and size in the three-dimensional virtual environment, and occupies some space in the three-dimensional virtual environment.

In some embodiments, the system 10 further includes a server 12. The server 12 establishes a communication connection (for example, a network connection) with the first terminal 11, and is configured to provide backend services for the target application. The server may be an independent physical server, or may be a server cluster including a plurality of physical servers or a distributed system, or may be a cloud server providing a cloud computing service.

In some embodiments, the system 10 further includes a second terminal 13, and the server 12 establishes a communication connection (for example, a network connection) with the second terminal 13. A target application, for example, a second client of the target application, is installed and run on the second terminal 13. A second user account is logged in the second client. When a virtual object corresponding to the second user account and the target virtual object are in the same game battle, and interaction information is displayed in the first client, corresponding interaction information is also displayed in the second client.

The terminal is an electronic device with data computing, processing, and storage capabilities. The terminal may be a smartphone, a tablet computer, a personal computer (PC), a wearable device, or the like, which is not limited in the embodiments of the present disclosure. In some embodiments, the terminal is a mobile terminal device with a touch display screen, and the user can achieve human-computer interaction through the touch display screen. In some embodiments, the terminal corresponds to a control handle, and a communication connection is established between the control handle and the terminal. The user may perform human-computer interaction with the client of the target application through the control handle.

The technical solutions of the present disclosure are described by using several embodiments below.

Figure 2:
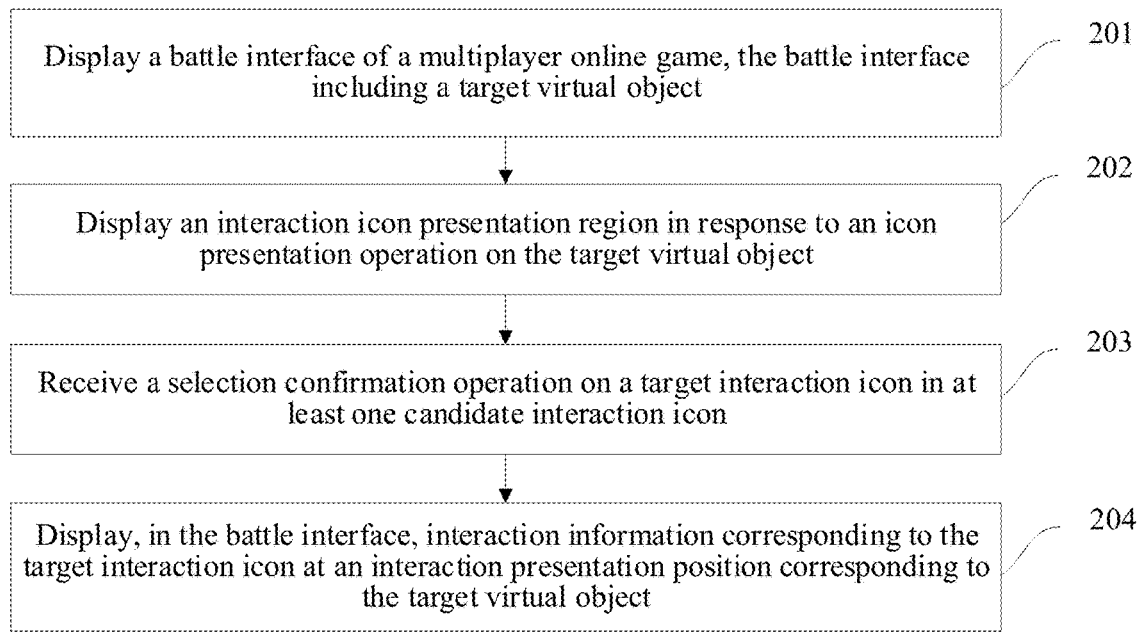
FIG. 2 is a flowchart of an interaction information processing method according to an embodiment of the present disclosure.

FIG. 2 is a flowchart of an interaction information processing method according to an embodiment of the present disclosure. In this embodiment, descriptions are made by using an example in which the method is applied to the first client described above. As shown in FIG. 2, the method may include the following steps (201 to 204):

Step 201: Display a battle interface of a multiplayer online game, the battle interface including a target virtual object.

In some embodiments, the multiplayer online game is an arena game battle, and the multiplayer game battle in the target application includes a plurality of virtual objects (for example, the target virtual object). In some embodiments, the multiplayer online game may be alternatively a battle scenario of another type, such as a multiplayer competition battle or a multiplayer debate, which is not specifically limited in the embodiments of the present disclosure. In some embodiments, the plurality of virtual objects are respectively controlled by different users through corresponding user accounts. The target virtual object is a virtual object controlled by the user through the first user account, and the target virtual object is displayed in the battle interface of the first client.

Step 202: Display an interaction icon presentation region in response to an icon presentation operation on the target virtual object.

In some embodiments, after the first client receives the icon presentation operation on the target virtual object, the interaction icon presentation region is presented in the battle interface, the interaction icon presentation region being used for presenting candidate interaction icons. The interaction icon presentation region includes at least one candidate interaction icon. In some embodiments, the icon presentation operation is a touch operation directly acting on the target virtual object. It may be alternatively understood that the icon presentation operation is a touch operation directly acting on a display position of the target virtual object.

Figure 3:
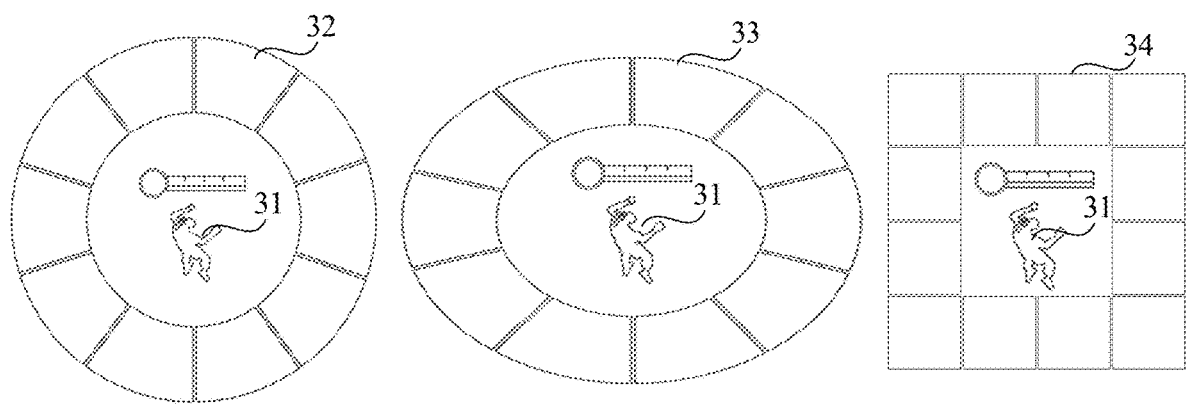
FIG. 3 is a schematic diagram of an interaction icon presentation region according to an embodiment of the present disclosure.

In some embodiments, as shown in FIG. 3, the interaction icon presentation region is a ring-shaped region centered on a target virtual object 31. In some embodiments, the ring-shaped region is an annular region 32, an elliptical annular region 33, a square annular region 34, or the like. Apparently, the ring-shaped region may further have other shapes, which is not specifically limited in the embodiments of the present disclosure.

Figure 4:
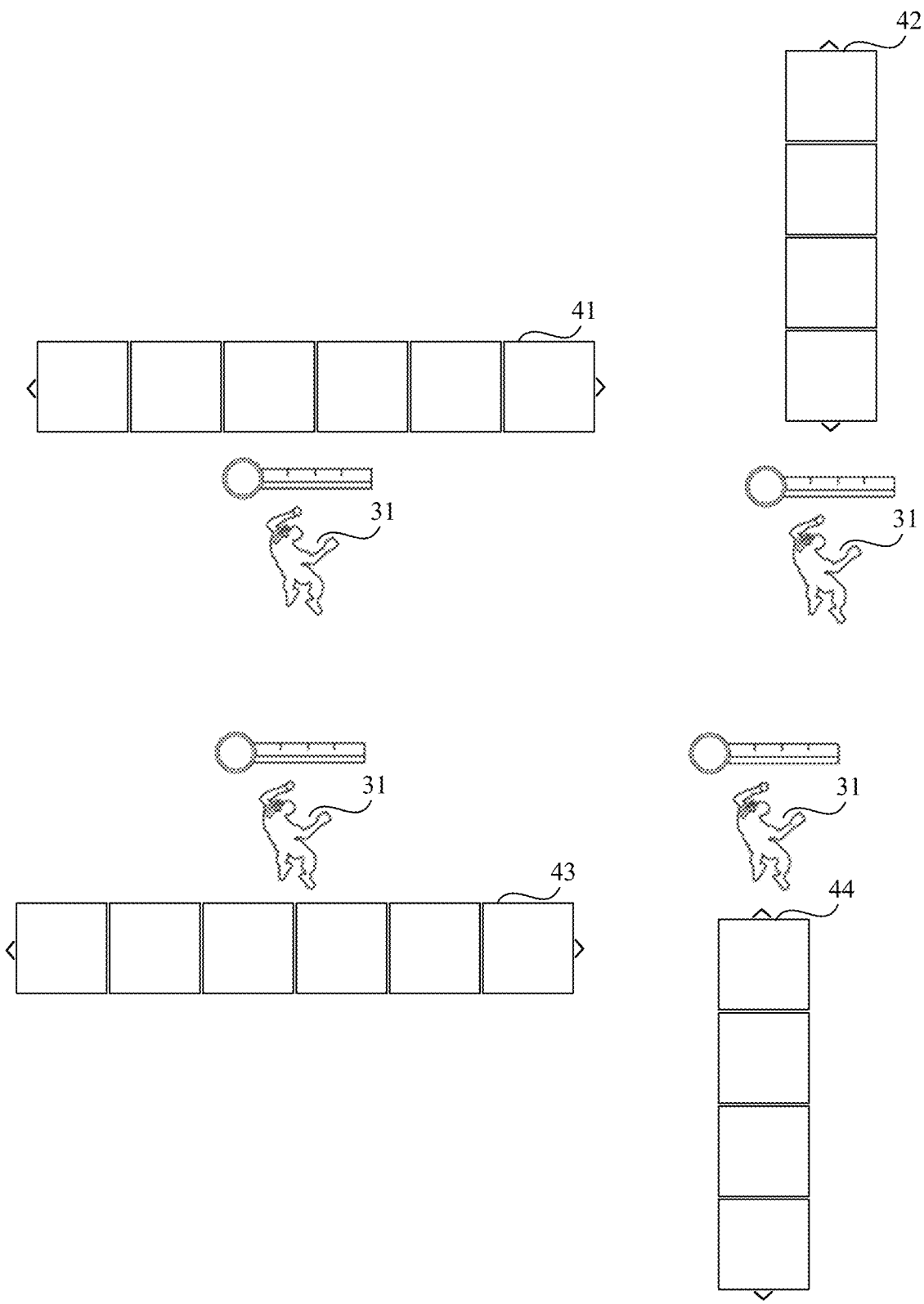
FIG. 4 is a schematic diagram of an interaction icon presentation region according to another embodiment of the present disclosure.

As shown in FIG. 4, in some embodiments, the interaction icon presentation region is a strip-shaped region located above the target virtual object 31. In an example, the interaction icon presentation region is a transverse strip-shaped region 41 located above the target virtual object 31; and in another example, the interaction icon presentation region is a vertical strip-shaped region 42 located above the target virtual object 31. In some other embodiments, the interaction icon presentation region is a strip-shaped region located below the target virtual object 31. In an example, the interaction icon presentation region is a transverse strip-shaped region 43 located below the target virtual object 31; and in another example, the interaction icon presentation region is a vertical strip-shaped region 44 located below the target virtual object 31.

Figure 5:
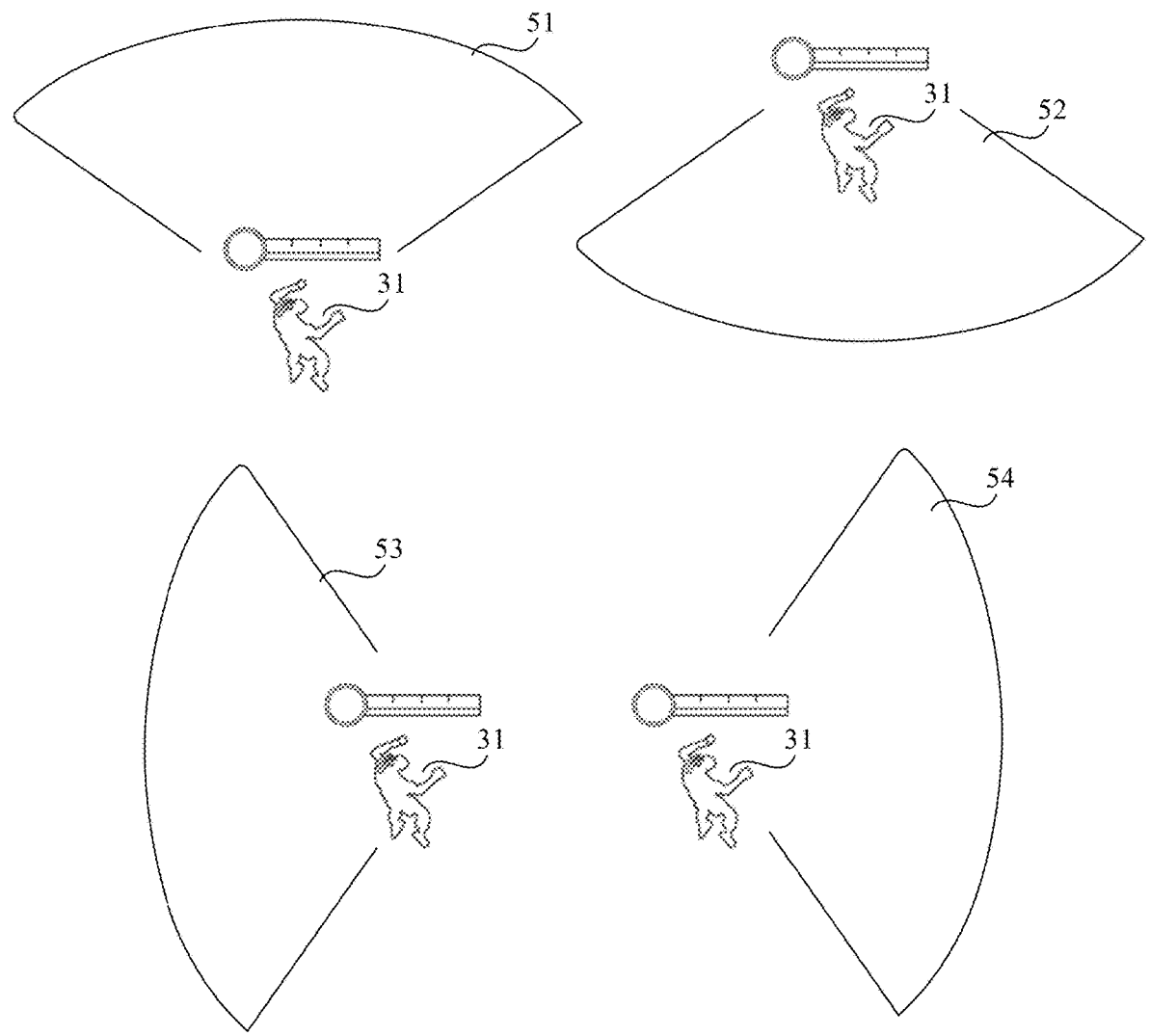
FIG. 5 is a schematic diagram of an interaction icon presentation region according to another embodiment of the present disclosure.

In some other embodiments, as shown in FIG. 5, the interaction icon presentation region is a fan-shaped region centered on the target virtual object 31. The interaction icon presentation region may be a fan-shaped region 51 located above the target virtual object 31, a fan-shaped region 52 located below the target virtual object 31, a fan-shaped region 53 located on a left side of the target virtual object 31, or a fan-shaped region 54 located on a right side of the target virtual object 31, which is not specifically limited in the embodiments of the present disclosure.

In some other embodiments, the icon presentation operation is an operation in which a finger of a user acts directly on the target virtual object (that is, acts on the display position of the target virtual object). The first client can obtain fingerprints of at least one finger that are pre-stored by the user in the first terminal, and store relevant information of the fingerprints. The relevant information of the fingerprints may indicate whether each fingerprint corresponds to a fingerprint of a left-hand finger or a fingerprint of a right-hand finger. By comparing a fingerprint of the finger acting on the target virtual object with the pre-stored fingerprints of the at least one finger, it is determined whether the finger acting on the target virtual object is a left-hand or right-hand finger of the user, and the interaction icon presentation region is displayed at a position corresponding to the left/right hand.

In some embodiments, the position corresponding to the left/right hand is a position that helps the user to observe the candidate interaction icons, which reduces or avoids occlusion of the interaction icon presentation region by the hand. That is, if the finger acting on the target virtual object is a left-hand finger of the user, the interaction icon presentation region is displayed at a position not occluded by the left-hand finger (that is, on the right side of the target virtual object); and if the finger acting on the target virtual object is a right-hand finger of the user, the interaction icon presentation region is displayed at a position not occluded by the right-hand finger (that is, on the left side of the target virtual object). In an example, based on the example of FIG. 5, when it is detected that an operating object of the icon presentation operation acting on the target virtual object is the left-hand finger of the user, the left region of the target virtual object may be occluded by the left hand, so that the interaction icon presentation region is the fan-shaped region 54 located on the right side of the target virtual object 31; and in another example, when it is detected that the operating object of the icon presentation operation acting on the target virtual object is the right-hand finger of the user, the right region of the target virtual object may be occluded by the left hand, so that the interaction icon presentation region is the fan-shaped region 53 located on the left side of the target virtual object 31. Therefore, the probability that the finger or palm of the user occludes the interaction icon presentation region is reduced, which helps the user to quickly select the interaction icon.

In some embodiments, hand occlusion has little impact on the interaction icon selection by the user (for example, the interaction icon occupies a large display region). In some embodiments, the position corresponding to the left/right hand is a position that helps the user to perform a selection confirmation operation on the target interaction icon. That is, if the finger acting on the target virtual object is the left-hand finger of the user, the interaction icon presentation region is displayed on the left side of the target virtual object; and if the finger acting on the target virtual object is the right-hand finger of the user, the interaction icon presentation region is displayed on the right side of the target virtual object. In an example, based on the example of FIG. 5, when it is detected that the operating object of the icon presentation operation acting on the target virtual object is the left-hand finger of the user, the interaction icon presentation region is the fan-shaped region 53 located on the left side of the target virtual object 31; and in another example, when it is detected that the operating object of the icon presentation operation acting on the target virtual object is the right-hand finger of the user, the interaction icon presentation region is the fan-shaped region 54 located on the right side of the target virtual object 31. Therefore, it is convenient for the user to perform the selection confirmation operation on the target interaction icon, and the operation convenience is improved.

In some embodiments, the foregoing fingerprint collection and fingerprint comparison process is performed using an under-screen fingerprint recognition technology.

It is easy to learn that the interaction icon presentation region may be alternatively a region that is located at other positions (for example, an upper left part, an upper right part, a lower left part, or a lower right part of the target virtual object) or a region that is displayed in other shapes. The specific shape and display position of the interaction icon presentation region are set by a person skilled in the art according to an actual situation, which is not specifically limited in the embodiments of the present disclosure. The interaction icon presentation region is displayed close to the target virtual object according to the position of the target virtual object, thereby reducing a movement distance of the operating object (for example, a finger of the user), making it convenient to perform the following selection confirmation operation on the target interaction icon, and further improving the convenience of the user operation.

Step 203: Receive a selection confirmation operation on a target interaction icon in the at least one candidate interaction icon.

When interaction information the user wants to display is the interaction information corresponding to the target interaction icon, the user may perform the selection confirmation operation on the target interaction icon through the first client. In some embodiments, the selection confirmation operation includes a selection operation and a confirmation operation. The selection operation is used for selecting the target interaction icon, and the confirmation operation is used for making a final confirmation on the selection operation (that is, the target interaction icon selected by the selection operation).

Step 204: Display, in the battle interface, interaction information corresponding to the target interaction icon at an interaction presentation position corresponding to the target virtual object.

In some embodiments, after the selection confirmation operation on the target interaction icon is received, the interaction information corresponding to the target interaction icon is displayed around the target virtual object. The interaction information is used for interacting with other virtual objects (or users corresponding to the other virtual objects). In some embodiments, the interaction presentation position corresponding to the target virtual object is preset by a person skilled in the art (that is, the developer of the target application), or may be set by the user. For example, a dynamic expression (e.g., emoji) corresponding to the target interaction icon is displayed above the target virtual object, to enhance the fun of the interaction information. In some embodiments, the interaction presentation position corresponding to the target virtual object is located above the target virtual object. The interaction information corresponding to the target interaction icon may include: the target interaction icon, an animation or a cinemagraph corresponding to the target interaction icon, an action corresponding to the target interaction icon made by the target virtual object, text interaction information corresponding to the target interaction icon, audio interaction information corresponding to the target interaction icon, video interaction information corresponding to the target interaction icon, and the like.

Figure 6:
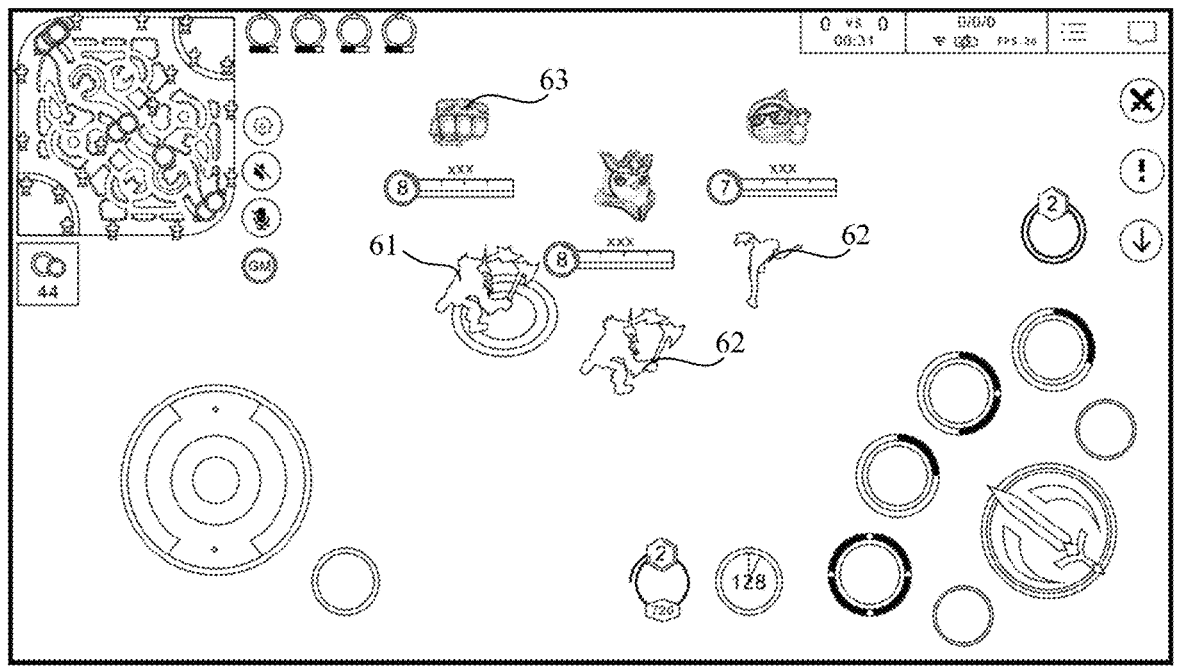
FIG. 6 is a schematic diagram of a battle interface according to an embodiment of the present disclosure.
Figure 7:
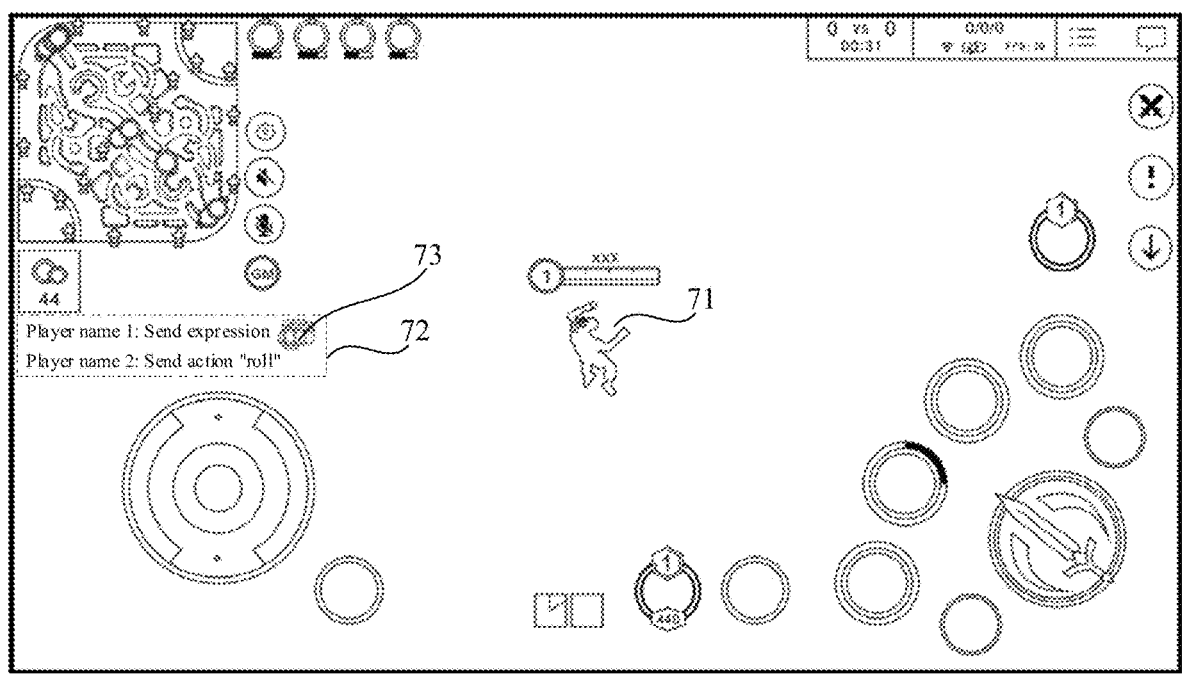
FIG. 7 is a schematic diagram of a battle interface according to another embodiment of the present disclosure.

In some embodiments, as shown in FIG. 6, interaction information 63 corresponding to the target interaction icon is also displayed in clients corresponding to other virtual objects 62 in the same battle as the target virtual object 61 (regardless of whether the virtual objects 62 are ally virtual objects or enemy virtual objects). In some embodiments, as shown in FIG. 7, there is no target virtual object displayed in the battle interface of the client corresponding to another virtual object 71, and interaction information 73 corresponding to the target interaction icon is then displayed in a chat region 72 in the battle interface in a form of chat content.

Based on the above, in the technical solutions provided in the embodiments of the present disclosure, through the icon presentation operation acting on the battle interface of the multiplayer online game, the display of the candidate interaction icons can be triggered efficiently. Through the selection confirmation operation on the target interaction icon, the target interaction icon can then be quickly selected and the corresponding interaction information can be displayed. Compared with a case of finding and clicking a chat control, then finding and clicking an expression control, and then finding and clicking a target interaction icon to display corresponding interaction information, the present disclosure can simplify the operation steps of displaying the interaction information and improve the operation convenience.

In addition, in the embodiments of the present disclosure, the interaction icon can be selected and confirmed through the operation on the target virtual object without setting additional interaction controls in the battle interface, which reduces the quantity of controls in the battle interface, and reduces the probability of mis-operation of the user on the controls, thereby improving the operation convenience.

Figure 8:
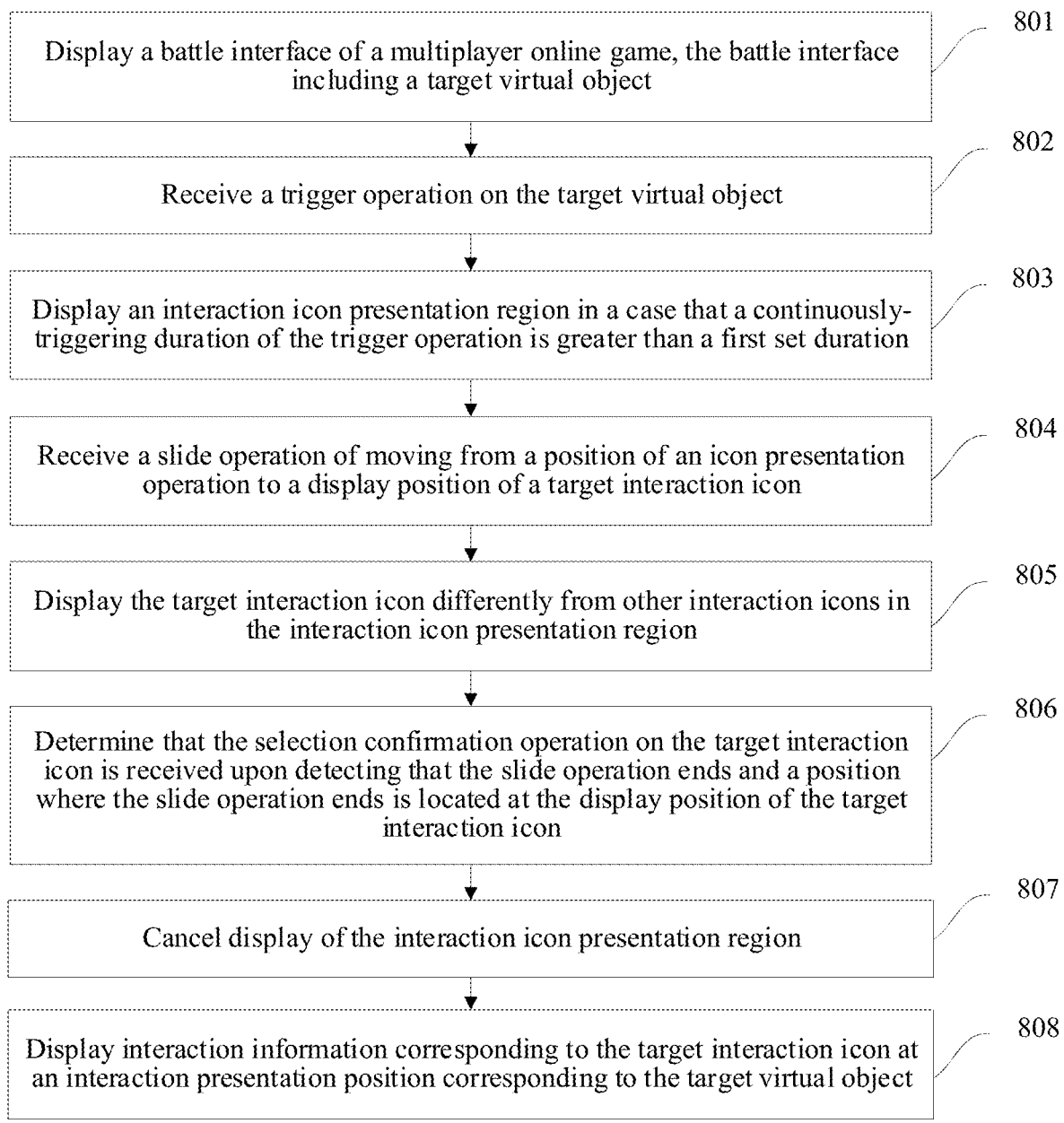
FIG. 8 is a flowchart of an interaction information processing method according to another embodiment of the present disclosure.

FIG. 8 is a flowchart of an interaction information processing method according to another embodiment of the present disclosure. In this embodiment, descriptions are made by using an example in which the method is applied to the first client described above. As shown in FIG. 8, the method may include the following steps (801 to 808):

Step 801: Display a battle interface of a multiplayer online game, the battle interface including a target virtual object.

The content of step 801 is the same as or similar to that of step 201 in the foregoing embodiment in FIG. 2, and details are not described herein again.

Step 802: Receive a trigger operation on the target virtual object.

In some embodiments, the icon presentation operation is a trigger operation acting on the target virtual object. In some embodiments, the trigger operation is a click operation, that is, directly clicking the target virtual object. In some embodiments, an operating object of the trigger operation is a human part or an object such as a finger or a stylus pen that can perform a touch operation.

Step 803: Display an interaction icon presentation region when a continuously-triggering duration of the trigger operation is greater than a first set duration.

In some embodiments, the continuously-triggering duration of the trigger operation is detected after the user clicks the target virtual object. In some embodiments, if the trigger operation is a click operation, the continuously-triggering duration is a continuously-clicking duration. In some embodiments, clicking continuously may be alternatively understood as a long-press operation, and the continuously-clicking duration may be considered as a long-press duration. When the continuously-clicking duration of the click operation is greater than the first set duration, the icon presentation operation is completed, and the interaction icon presentation region is displayed. If the continuously-clicking duration is too short (less than the first set duration), the interaction icon presentation region is not displayed, thereby reducing the probability of accidental touch. The first set duration may be 0.5 seconds, 0.8 seconds, 1 second, 1.5 seconds, 2 seconds, or the like. In some embodiments, the specific duration of the first set duration is set by a person skilled in the art according to the actual situation, which is not specifically limited in the embodiments of the present disclosure.

In some other optional embodiments, the icon presentation operation may be alternatively a double-click operation, a triple-click operation, a hovering operation, a heavy pressure operation, a slide operation, or the like acting on the target virtual object. In some embodiments, the continuously-clicking duration of each click operation of the double-click operation and the triple-click operation is not limited in the embodiments of the present disclosure, and when it is detected that the user has clicked the target virtual object, it means that one click operation is completed.

In some embodiments, the hovering operation means that a residence time of an operating object (for example, a finger of the user or a stylus pen) within a set distance above the target virtual object reaches a second set duration. The set distance may be 1 mm, 1.5 mm, 2 mm, 2.5 mm, 3 mm, 4 mm, 5 mm, 8 mm, 1 cm, 2 cm, or the like. The second set duration may be 0.5 seconds, 0.8 seconds, 1 second, 1.5 seconds, 2 seconds, or the like. In some embodiments, the specific duration of the second set duration is set by a person skilled in the art according to the actual situation, which is not specifically limited in the embodiments of the present disclosure. In some embodiments, the hovering operation may be alternatively an operation in which a mouse stays at the display position of the target virtual object but does not click the target virtual object, and the residence time reaches the second set duration.

In some embodiments, the battle interface is displayed through a touch display screen, which is a pressure display screen. The first client may respond to different instructions by detecting different pressures acting on the pressure display screen. In some optional embodiments, the heavy pressure operation means that a pressure acting on the target virtual object by the operating object controlled by the user is greater than or equal to a times (that is, a pressure threshold) an average pressure acting on the pressure display screen by the operating object, where a is greater than 1, and may be 1.5, 2, 2.5, 3, 4, or the like. The specific value of a is set by a person skilled in the art according to the actual situation, which is not specifically limited in the embodiments of the present disclosure. In some other optional embodiments, the heavy pressure operation means that a pressure acting on the target virtual object by the operating object controlled by the user is greater than or equal to a set pressure. The specific of the set pressure is set by a person skilled in the art according to the actual situation, which is not specifically limited in the embodiments of the present disclosure.

Step 804: Receive a slide operation of moving from an influence position of an icon presentation operation to a display position of a target interaction icon.

Figure 9:
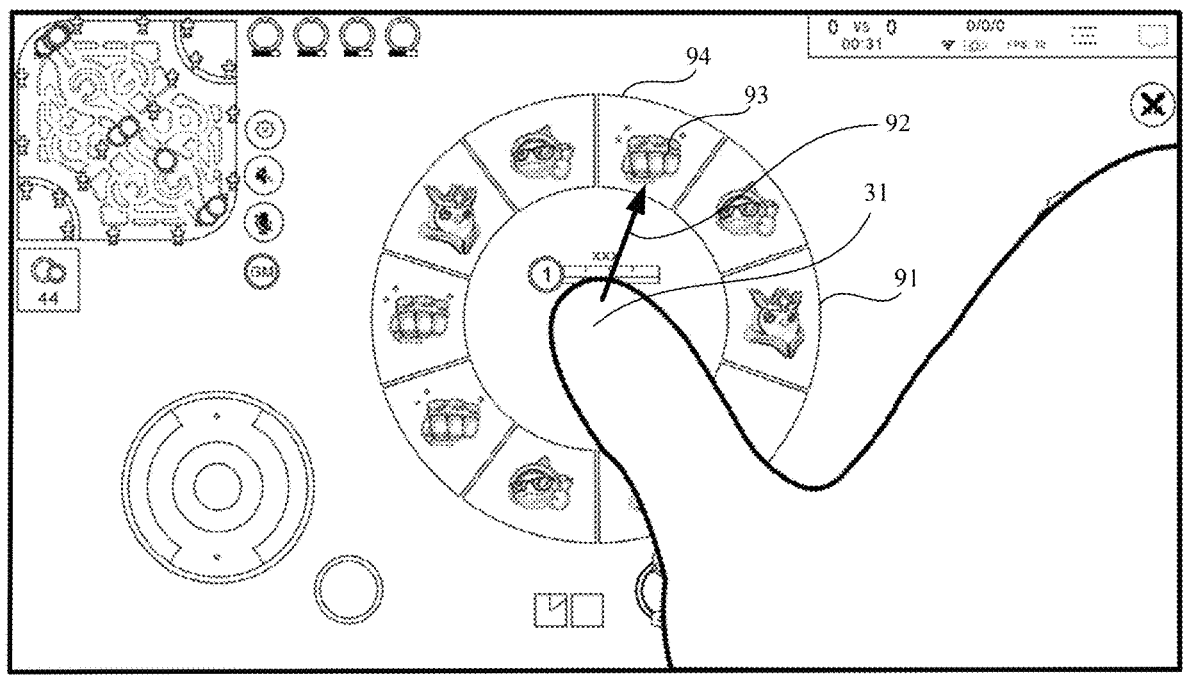
FIG. 9 is a schematic diagram of a battle interface according to another embodiment of the present disclosure.

As shown in FIG. 9, after an interaction icon presentation region 91 is located around the target virtual object 31, a selection operation on the target interaction icon is a slide operation 92 of moving from the influence position of the icon presentation operation to the display position of the target interaction icon. In some embodiments, the display position of the target interaction icon is a display region 93 of the target interaction icon; and in some other embodiments, the display position of the target interaction icon is a box 94 where the target interaction icon is located.

Step 805: Display the target interaction icon differently from other interaction icons in the interaction icon presentation region.

In some embodiments, after the slide operation of moving from the influence position of the icon presentation operation to the display position of the target interaction icon is received, the target interaction icon is displayed differently from the other interaction icons in the interaction icon presentation region, so that the target interaction icon is highlighted, which helps the user to confirm the selected target interaction icon. In some embodiments, the displaying the target interaction icon differently from other interaction icons in the interaction icon presentation region to make the target interaction icon displayed in a style different from the other interaction icons in the interaction icon presentation region includes: increasing display brightness of the target interaction icon, decreasing display brightness of the other interaction icons, changing a display color of the target interaction icon from gray to color, changing a display color of the other interaction icons from color to gray, zooming in to display the target interaction icon, zooming out to display the other interaction icons, dynamically displaying the target interaction icon, and the like. In some embodiments, when the target interaction icon is displayed dynamically, the other interaction icons are displayed statically.

Step 806: Determine that the selection confirmation operation on the target interaction icon is received when detecting that the slide operation ends and a position where the slide operation ends is located at the display position of the target interaction icon.

In some embodiments, a case in which the slide operation ends at the display position of the target interaction icon, and the slide operation does not move to another position (that is, the operating object (for example, a finger) controlled by the user releases the target interaction icon) indicates that the user completes the selection confirmation operation on the target interaction icon.

Step 807: Cancel display of the interaction icon presentation region.

In some embodiments, after it is determined that the selection confirmation operation on the target interaction icon is received, it indicates that the interaction icon finally selected by the user is the target interaction icon, and it is no longer necessary to display the interaction icon presentation region. Therefore, the display of the interaction icon presentation region is canceled, which reduces occlusion of other elements in the battle interface by the interaction icon presentation region.

Step 808: Display interaction information corresponding to the target interaction icon at an interaction presentation position corresponding to the target virtual object.

The content of step 808 is the same as or similar to that of step 204 in the foregoing embodiment in FIG. 2, and details are not described herein again.

Based on the above, in the technical solutions provided in the embodiments of the present disclosure, the user continuously clicks the target virtual object, and the operating object slides from the influence position of the icon presentation operation to the display position of the target interaction icon, and is released at the position of the target interaction icon, to display the interaction information corresponding to the target interaction icon. In the operating process, the operating object (for example, a finger of the user) is always on the touch screen displaying the battle interface, and can implement the operation in one step without leaving the display screen. Compared with touching the touch screen for a plurality of times, the operation time is reduced, and the operation efficiency and the operation convenience are improved.

Figure 10:
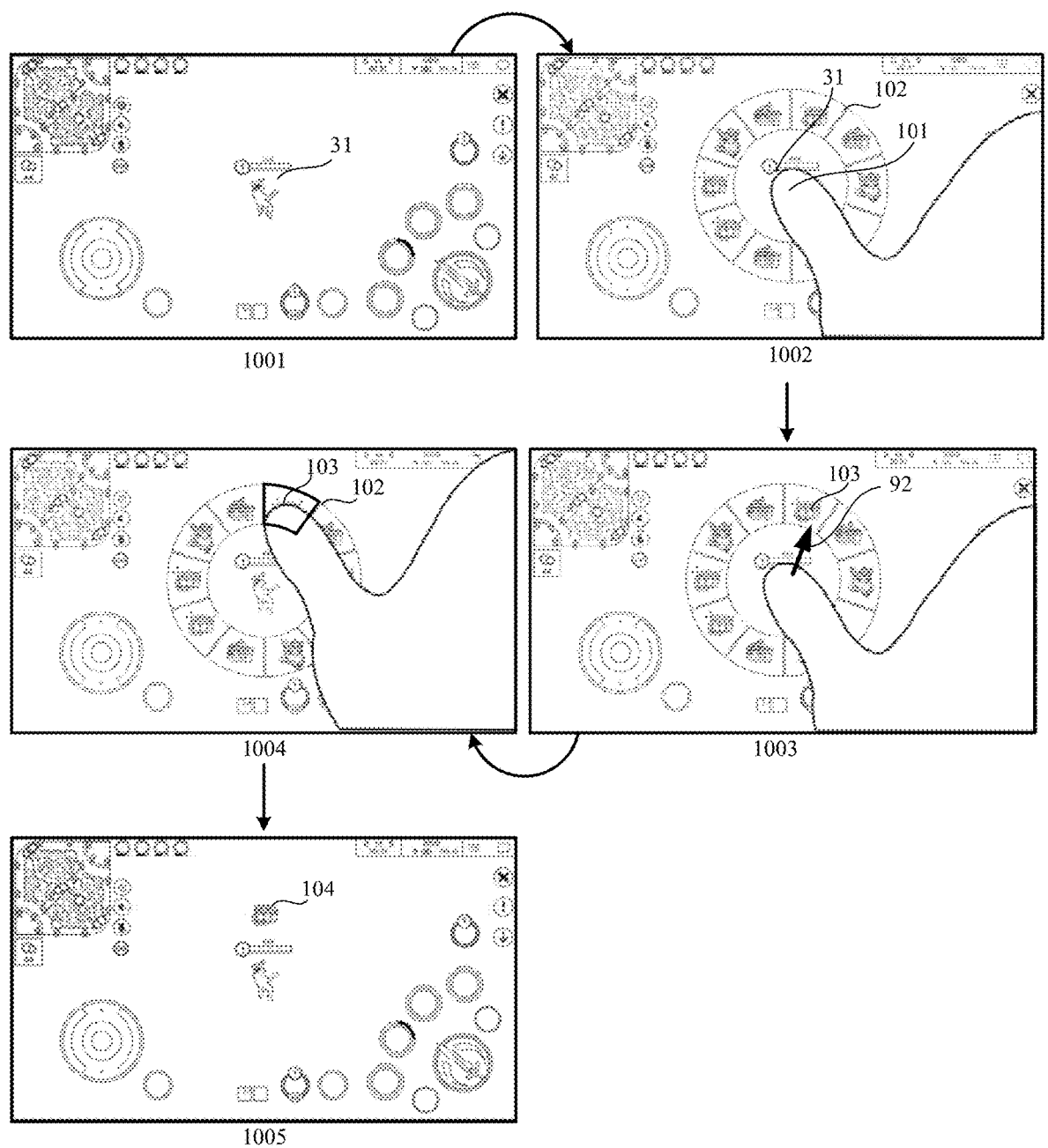
FIG. 10 is a schematic diagram of an interaction information processing method according to an embodiment of the present disclosure.

The interaction information processing method provided in the embodiments of the present disclosure is described in summary below with reference to FIG. 10. The method may be applied to the first client described above. As shown in FIG. 10, the method may further include the following steps (1001 to 1005):

Step 1001: Display a battle interface of a multiplayer online game, the battle interface including a target virtual object 31.

Step 1002: Display an interaction icon presentation region 102 in response to a long-press operation 101 for the target virtual object 31.

Step 1003: Receive a slide operation 92 of moving from an influence position of the icon presentation operation to a display position of the target interaction icon 103.

Step 1004: Display the target interaction icon 103 differently from other interaction icons in the interaction icon presentation region 102.

Step 1005: Display interaction information 104 corresponding to the target interaction icon 103 in a case of detecting that the operating object controlled by the user releases the target interaction icon 103.

In some embodiments, after the displaying the interaction icon presentation region, the method further includes the following steps:

1: displaying a default selected icon in the interaction icon presentation region differently from other interaction icons, the default selected icon being an interaction icon in a default selected state; and
2: displaying, in response to a selection confirmation operation on the default selected icon, interaction information corresponding to the default selected icon at the interaction presentation position corresponding to the target virtual object.

In some embodiments, the default selected icon is displayed differently from other interaction icons, which helps the user to quickly find the default selected icon and perform the selection confirmation operation on the default selected icon, so that the operation time required to display the interaction information is reduced, and the operation efficiency is improved. In some embodiments, displaying the default selected icon differently from the other interaction icons may refer to the content of displaying the target interaction icon differently from the other interaction icons in the interaction icon presentation region in step 805 in the foregoing embodiment of FIG. 8, and details are not described herein again.

In some embodiments, after the interaction icon presentation region is displayed, if there is a default selected icon displayed differently from the other interaction icons, and what the user wants to select is the default selected icon, interaction information corresponding to the default selected icon may be displayed directly at the interaction presentation position corresponding to the target virtual object by performing the selection confirmation operation on the default check icon, without performing a selection operation on the default selected icon, thereby further simplifying the operation step of displaying the interaction information and improving the operation convenience.

In some embodiments, the selection confirmation operation on the default selected icon includes: continuing continuously clicking the target virtual object to reach a third set duration, a slide operation of moving from the influence position of the icon presentation operation to a position other than the interaction icon presentation region, and the like. The third set duration may be 0.5 seconds, 0.8 seconds, 1 second, 1.5 seconds, or the like, and the specific duration of the third set duration may be set by a person skilled in the art according to the actual situation, which is not specifically limited in the embodiments of the present disclosure.

In some embodiments, the default selected icon is an interaction icon at a default position in the interaction icon presentation region. The interaction icon at the default position may be an interaction icon farthest from or closest to the target virtual object, or a leftmost or topmost interaction icon in an elongated interaction icon presentation region.

In some other embodiments, the default selected icon is preset by the user corresponding to the first user account or preset by a person skilled in the art (for example, the developer of the target application).

In some other embodiments, the default selected icon is an interaction icon corresponding to the last displayed interaction information.

In some other embodiments, the default selected icon is an interaction icon used most times by the user corresponding to the first user account in this multiplayer online game. Alternatively, the default selected icon is an interaction icon used most times by the user corresponding to the first user account in last n multiplayer online games. n may be a positive integer such as 5, 10, 15, 20, 30, or 40. The specific value of n is set by a person skilled in the art according to the actual situation, which is not specifically limited in the embodiments of the present disclosure.

In some embodiments, after the displaying the battle interface of the multiplayer online game, the method further includes: displaying, in response to a shortcut send operation on the target virtual object, interaction information corresponding to a default selected icon at the interaction presentation position corresponding to the target virtual object, the default selected icon being an interaction icon in a default selected state. In this implementation, the shortcut operation manner is an operation manner different from the icon presentation operation. Through the shortcut operation manner, the interaction information corresponding to the default selected icon is displayed directly without displaying the interaction icon presentation region, which further simplifies the operation step of displaying the interaction information and improves the operation convenience. In some embodiments, the shortcut send operation is a slide operation (for example, sliding left, sliding right, sliding up, or sliding down) for the target virtual object, a double-click operation on the target virtual object, a triple-click operation on the target virtual object, a heavy pressure operation on the target virtual object, a quick-click operation on the target virtual object, or the like, which is not specifically limited in the embodiments of the present disclosure.

In some embodiments, after the displaying a battle interface of a multiplayer online game, the method further includes the following steps:

1: displaying a recommended interaction icon when the multiplayer online game is in a preset battle state; and
2: displaying interaction information corresponding to the recommended interaction icon in response to a selection confirmation operation on the recommended interaction icon.

The preset battle state includes: obtaining a large advantage in the battle, defeating another virtual object in this battle for the first time, cumulatively defeating b other virtual objects once in this battle, winning the battle, failing the battle, and the like, which is not specifically limited in the embodiments of the present disclosure, where b is a positive integer. For example, if the battle state is winning the battle, the corresponding interaction information is information indicating celebration or joy; and if the battle state is failing the battle, the corresponding interaction information is information indicating frustration, comfort, or encouragement. In this embodiment, the recommended interaction icon matching the battle state is displayed to help the use select the interaction icon, thereby reducing the selection time of the user and improving the display efficiency of the interaction information.

Figure 11:
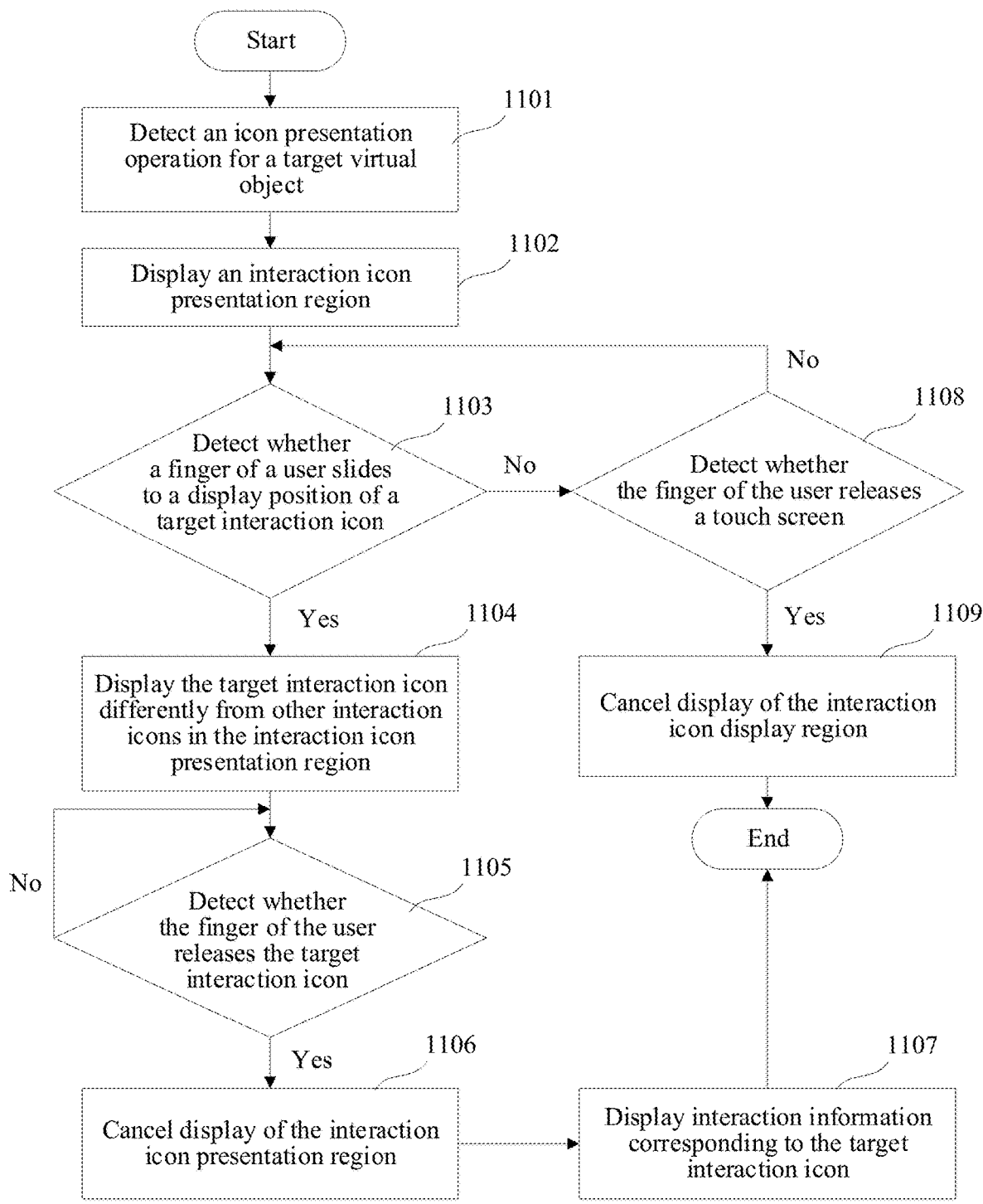
FIG. 11 is a flowchart of an interaction information processing method according to another embodiment of the present disclosure.
Figure 12:
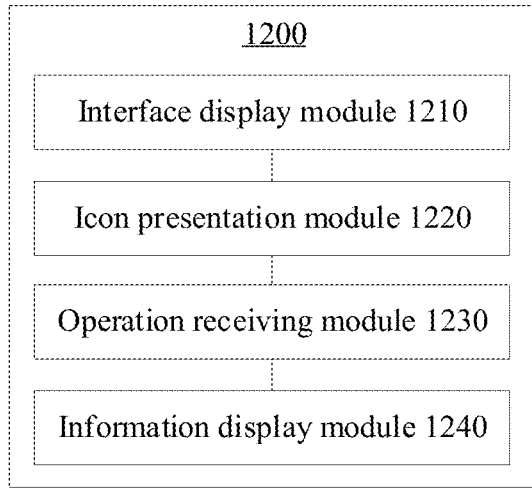
FIG. 12 is a block diagram of an interaction information processing apparatus according to an embodiment of the present disclosure.

FIG. 11 is a flowchart of an interaction information processing method according to another embodiment of the present disclosure. As shown in FIG. 11, the method may include the following steps (1101 to 1109):

Step 1101: Detect an icon presentation operation on a target virtual object.

Step 1102: Display an interaction icon presentation region.

Step 1103: Detect whether a finger of a user slides to a display position of a target interaction icon, and if so, perform step 1108; otherwise, perform step 1104.

Step 1104: Display the target interaction icon differently from other interaction icons in the interaction icon presentation region.

Step 1105: Detect whether the finger of the user releases the target interaction icon, and if so, perform step 1106; otherwise, perform step 1104.

Step 1106: Cancel display of the interaction icon presentation region.

Step 1107: Display interaction information corresponding to the target interaction icon, and end the process.

Step 1108: Detect whether the finger of the user releases a touch screen, and if so, perform step 1109; otherwise, perform step 1103.

Step 1109: Cancel display of the interaction icon presentation region, and end the process.

The following describes apparatus embodiments of the present disclosure, which can be used for executing the method embodiments of the present disclosure. For details not disclosed in the apparatus embodiments of the present disclosure, refer to the method embodiments of the present disclosure.

FIG. 2 is a block diagram of an interaction information processing apparatus according to an embodiment of the present disclosure. The apparatus has functions of implementing the foregoing examples of the interaction information processing method. The functions may be implemented by hardware, or may be implemented by hardware executing corresponding software. The apparatus may be the first terminal described above, or may be disposed on the first terminal. The apparatus 1200 may include: an interface display module 1210, an icon presentation module 1220, an operation receiving module 1230, and an information display module 1240.

The interface display module 1210 is configured to display a battle interface of a multiplayer online game, the battle interface including a target virtual object.

The icon presentation module 1220 is configured to display an interaction icon presentation region in response to an icon presentation operation on the target virtual object, the interaction icon presentation region including at least one candidate interaction icon.

The operation receiving module 1230 is configured to receive a selection confirmation operation on a target interaction icon in the at least one candidate interaction icon.

The information display module 1240 is configured to display interaction information corresponding to the target interaction icon at an interaction presentation position corresponding to the target virtual object.

Based on the above, in the technical solutions provided in the embodiments of the present disclosure, through the icon presentation operation in the battle interface, the display of the candidate interaction icons can be triggered efficiently. Through the selection confirmation operation on the target interaction icon, the target interaction icon can then be quickly selected and the corresponding interaction information can be displayed. Compared with a case of finding and clicking a chat control, then finding and clicking an expression control, and then finding and clicking a target interaction icon to display corresponding interaction information, the present disclosure can simplify the operation steps of displaying the interaction information and improve the operation convenience.

In some embodiments, the icon presentation module 1220 is configured to:

receive a trigger operation on the target virtual object; and display the interaction icon presentation region when a continuously-triggering duration of the trigger operation is greater than a first set duration.

Figure 13:
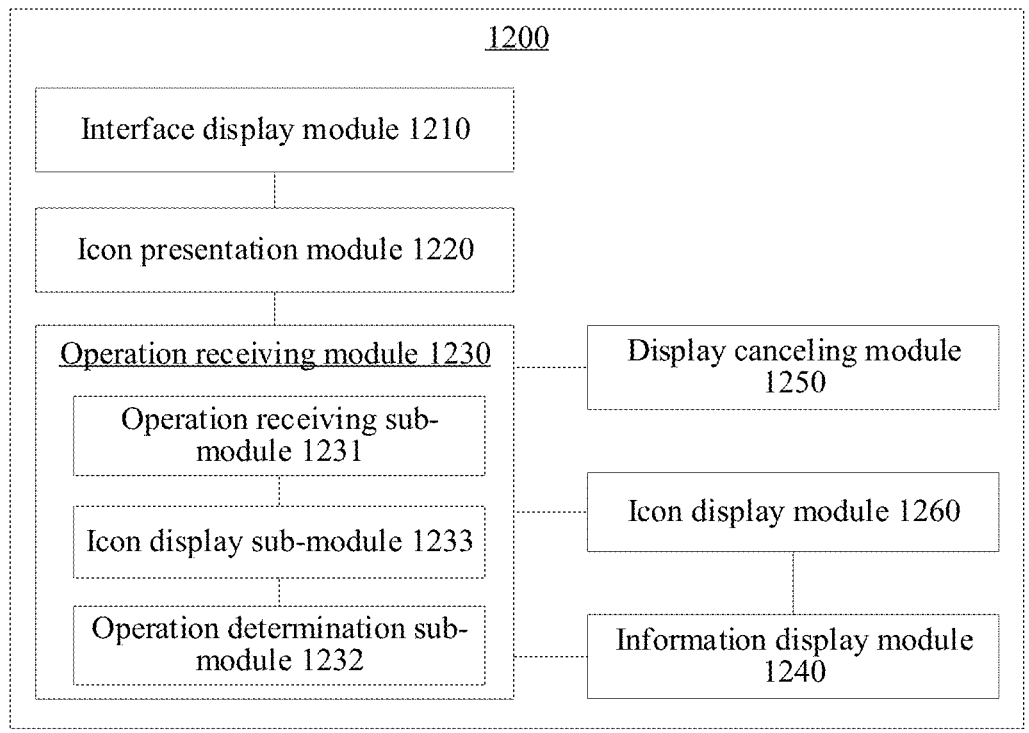
FIG. 13 is a block diagram of an interaction information processing apparatus according to another embodiment of the present disclosure.

In some embodiments, as shown in FIG. 13, the operation receiving module 1230 includes: an operation receiving sub-module 1231 and an operation determination sub-module 1232.

The operation receiving sub-module 1231 is configured to receive a slide operation of moving from an influence position of the icon presentation operation to a display position of the target interaction icon.

The operation determination sub-module 1232 is configured to determine that the selection confirmation operation on the target interaction icon is received when detecting that the slide operation ends and a position where the slide operation ends is located at the display position of the target interaction icon.

In some embodiments, as shown in FIG. 13, the operation receiving module 1230 further includes an icon display sub-module 1233.

The icon display sub-module 1233 is configured to display the target interaction icon differently from other interaction icons in the interaction icon presentation region.

In some embodiments, the interaction icon presentation region is a ring-shaped region centered on the target virtual object; or, the interaction icon presentation region is a strip-shaped region located above the target virtual object; or, the interaction icon presentation region is a fan-shaped region centered on the target virtual object.

In some embodiments, the information display module 1240 is configured to display a dynamic expression corresponding to the target interaction icon above the target virtual object.

In some embodiments, as shown in FIG. 13, the apparatus 1200 further includes a display canceling module 1250.

The display canceling module 1250 is configured to cancel display of the interaction icon presentation region.

In some embodiments, as shown in FIG. 13, the apparatus 1200 further includes an icon display module 1260.

The icon display module 1260 is configured to display a default selected icon in the interaction icon presentation region differently from other interaction icons, the default selected icon being an interaction icon in a default selected state.

The information display module 1240 is further configured to display, in response to a selection confirmation operation on the default selected icon, interaction information corresponding to the default selected icon at the interaction presentation position corresponding to the target virtual object.

In some embodiments, the information display module 1240 is further configured to display, in response to a shortcut send operation on the target virtual object, interaction information corresponding to a default selected icon at the interaction presentation position corresponding to the target virtual object, the default selected icon being an interaction icon in a default selected state.

In some embodiments, as shown in FIG. 13, the icon display module 1260 is further configured to display a recommended interaction icon when the multiplayer online game is in a preset battle state.

The information display module 1240 is further configured to display interaction information corresponding to the recommended interaction icon in response to a selection confirmation operation on the recommended interaction icon.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

Figure 14:
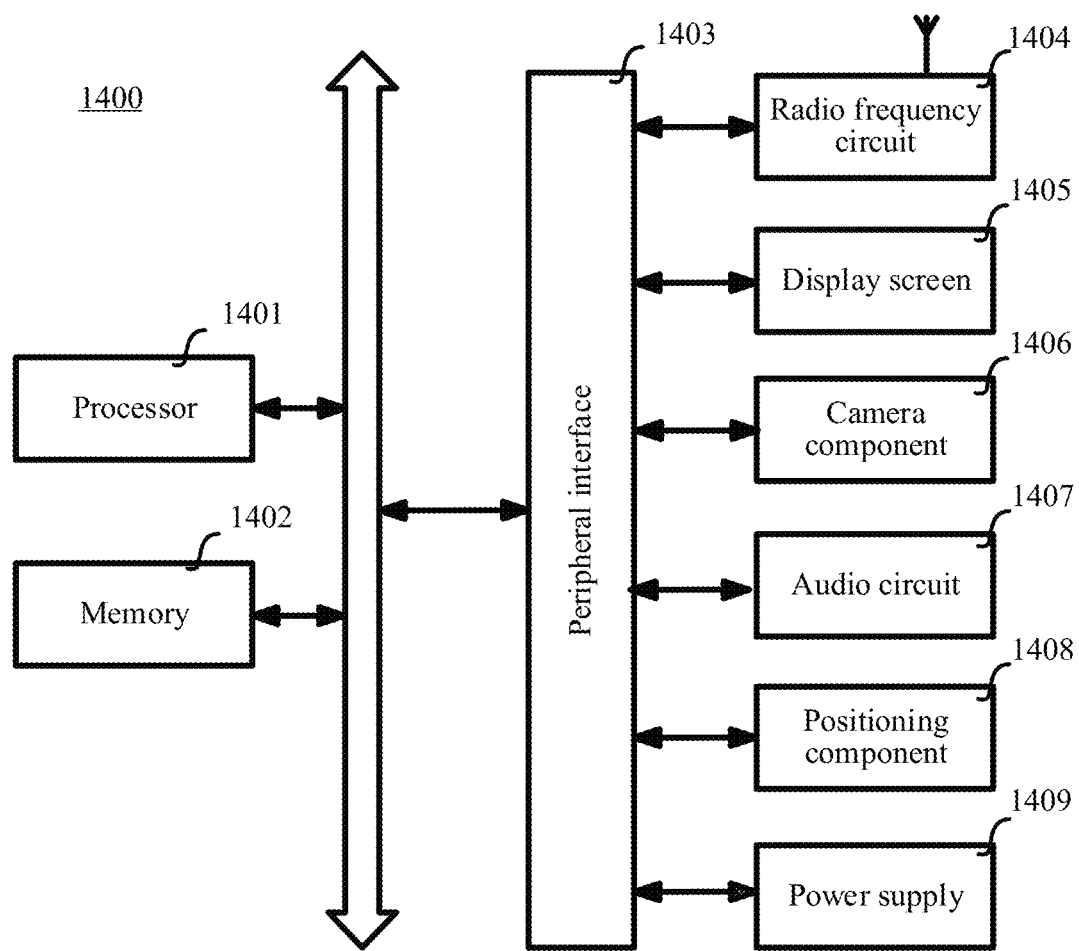
FIG. 14 is a block diagram of a terminal according to an embodiment of the present disclosure.

FIG. 14 is a structural block diagram of a terminal 1400 according to an embodiment of the present disclosure. The terminal 1400 may be an electronic device such as a mobile phone, a tablet computer, a game console, an ebook reader, a multimedia player, a wearable device, or a PC. The terminal is configured to implement the interaction information processing method provided in the foregoing embodiments. The terminal may be the first terminal 11 in the implementation environment shown in FIG. 1. Specifically:

Generally, the terminal 1400 includes a processor 1401 and a memory 1402.

The processor 1401 may include one or more processing cores, for example, a 4-core processor or an 8-core processor. The processor 1401 may be implemented by using at least one hardware form of a digital signal processor (DSP), a field programmable gate array (FPGA), and a programmable logic array (PLA). The processor 1401 may further include a main processor and a coprocessor. The main processor is a processor configured to process data in an awake state, and is also referred to as a central processing unit (CPU). The coprocessor is a low power consumption processor configured to process the data in a standby state. In some embodiments, the processor 1401 may be integrated with a graphics processing unit (GPU). The GPU is configured to render and draw content that needs to be displayed on a display. In some embodiments, the processor 1401 may further include an artificial intelligence (AI) processor. The AI processor is configured to process computing operations related to machine learning.

The memory 1402 may include one or more computer-readable storage media. The computer-readable storage medium may be non-transient. The memory 1402 may further include a high-speed random access memory and a nonvolatile memory, for example, one or more disk storage devices or flash storage devices. In some embodiments, the non-transient computer-readable storage medium in the memory 1402 is configured to store at least one instruction, at least one program, a code set, or an instruction set, and is configured to be executed by one or more processors, to implement the interaction information processing method.

In some embodiments, the terminal 1400 may optionally include a peripheral interface 1403 and at least one peripheral device. The processor 1401, the memory 1402, and the peripheral interface 1403 may be connected by a bus or a signal line. Each peripheral device may be connected to the peripheral interface 1403 by using a bus, a signal cable, or a circuit board. Specifically, the peripheral device includes: at least one of a radio frequency circuit 1404, a display screen 1405, a camera component 1406, an audio circuit 1407, a positioning component 1408, and a power supply 1409.

A person skilled in the art may understand that the structure shown in FIG. 14 does not constitute the limitation to the terminal 1400, and more or fewer components than those shown in the figure may be included, some components may be combined, or different components may be used for arrangement.

In an exemplary embodiment, a computer-readable storage medium is further provided. The storage medium stores at least one instruction, at least one program, a code set, or an instruction set, and the at least one instruction, the at least one program, the code set, or the instruction set, when executed by a processor, implements the foregoing interaction information processing method.

In some embodiments, the computer-readable storage medium may include: a read-only memory (ROM), a random access memory (RAM), solid state drives (SSD), an optical disc, or the like. The RAM may include a resistance random access memory (ReRAM) and a dynamic random access memory (DRAM).

In an exemplary embodiment, a computer program product or a computer program is further provided. The computer program product or the computer program includes computer instructions, and the computer instructions are stored in a computer-readable storage medium. A processor of a computer device reads the computer instructions from the computer-readable storage medium, and executes the computer instructions, to cause the computer device to execute the interaction information processing method.

"Plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An interaction information processing method, executed by a terminal, the method comprising:
 displaying a battle interface of a multiplayer online game, the battle interface comprising a target virtual object;
 displaying an interaction icon presentation region in response to an icon presentation operation on the target virtual object, the interaction icon presentation region comprising at least one candidate interaction icon;

displaying a default selected icon in the interaction icon presentation region in a different display style from other interaction icons, the default selected icon being an interaction icon in a default selected state;

displaying interaction information based on user selection in the interaction icon presentation region, comprising:

displaying, in response to a selection confirmation operation on the default selected icon, the interaction information corresponding to the default selected icon at an interaction presentation position corresponding to the target virtual object; and displaying, in response to receiving a slide operation of moving from a position of the icon presentation operation to a display position of a target interaction icon in the at least one candidate interaction icon, and in response to detecting that the slide operation ends and a position where the slide operation ends is located at the display position of the target interaction icon, in the battle interface, the interaction information corresponding to the target interaction icon at the interaction presentation position corresponding to the target virtual object.

2. The method according to claim 1, wherein after the receiving a slide operation of moving from an influence position of the icon presentation operation to a display position of the target interaction icon, the method further comprises:

displaying the target interaction icon in a different display style from other interaction icons in the interaction icon presentation region.

3. The method according to claim 1, wherein the interaction icon presentation region is a ring-shaped region centered on the target virtual object;

or, the interaction icon presentation region is a strip-shaped region located above the target virtual object;

or, the interaction icon presentation region is a fan-shaped region centered on the target virtual object.

4. The method according to claim 1, wherein the displaying interaction information corresponding to the target interaction icon at an interaction presentation position corresponding to the target virtual object comprises:

displaying a dynamic expression corresponding to the target interaction icon above the target virtual object.

5. The method according to claim 1, wherein after the slide operation or the selection confirmation operation on the default selected icon is received, the method further comprises:

canceling display of the interaction icon presentation region.

6. The method according to claim 1, wherein after the displaying a battle interface of a multiplayer online game, the method further comprises:

displaying, in response to a shortcut send operation on the target virtual object, interaction information corresponding to a default selected icon at the interaction presentation position corresponding to the target virtual object, the default selected icon being an interaction icon in a default selected state.

7. The method according to claim 1, wherein after the displaying a battle interface of a multiplayer online game, the method further comprises:

displaying a recommended interaction icon when the multiplayer online game is in a preset battle state; and displaying interaction information corresponding to the recommended interaction icon in response to a selection confirmation operation on the recommended interaction icon.

8. An interaction information processing apparatus, comprising a memory and a processor coupled to the memory, the processor being configured to:

display a battle interface of a multiplayer online game, the battle interface comprising a target virtual object;

display an interaction icon presentation region in response to an icon presentation operation on the target virtual object, the interaction icon presentation region comprising at least one candidate interaction icon;

display interaction information based on user selection in the interaction icon presentation region, comprising:

displaying, in response to a selection confirmation operation on an default selected icon, the interaction information corresponding to the default selected icon at an interaction presentation position corresponding to the target virtual object; and displaying, in response to receiving a slide operation of moving from a position of the icon presentation operation to a display position of a target interaction icon in the at least one candidate interaction icon, and in response to detecting that the slide operation ends and a position where the slide operation ends is located at the display position of the target interaction icon, in the battle interface, the interaction information corresponding to the target interaction icon at the interaction presentation position corresponding to the target virtual object.

9. The apparatus according to claim 8, wherein the processor is further configured to:

display the target interaction icon in a different display style from other interaction icons in the interaction icon presentation region.

10. The apparatus according to claim 8, wherein the interaction icon presentation region is a ring-shaped region centered on the target virtual object;

or, the interaction icon presentation region is a strip-shaped region located above the target virtual object;

or, the interaction icon presentation region is a fan-shaped region centered on the target virtual object.

11. The apparatus according to claim 8, wherein the processor is further configured to:

display, in response to a shortcut send operation on the target virtual object, interaction information corresponding to a default selected icon at the interaction presentation position corresponding to the target virtual object, the default selected icon being an interaction icon in a default selected state.

12. The apparatus according to claim 8, wherein the processor is further configured to:

display a dynamic expression corresponding to the target interaction icon above the target virtual object.

13. The apparatus according to claim 8, wherein the processor is further configured to:

cancel display of the interaction icon presentation region after the slide operation icon or the selection confirmation operation on the default selected icon is received.

14. A non-transitory computer-readable storage medium, storing at least one instruction, at least one program, a code set, or an instruction set, the at least one instruction, the at least one program, the code set, or the instruction set being loaded and executed by a processor, to implement:
displaying a battle interface of a multiplayer online game, the battle interface comprising a target virtual object;
displaying an interaction icon presentation region in response to an icon presentation operation on the target virtual object, the interaction icon presentation region comprising at least one candidate interaction icon;
display interaction information based on user selection in the interaction icon presentation region, comprising:
displaying, in response to a selection confirmation operation on an default selected icon, the interaction information corresponding to the default selected icon at an interaction presentation position corresponding to the target virtual object; and
displaying, in response to receiving a slide operation of moving from a position of the icon presentation operation to a display position of a target interaction icon in the at least one candidate interaction icon, and in response to detecting that the slide operation ends and a position where the slide operation ends is located at the display position of the target interaction icon, in the battle interface, the interaction information corresponding to the target interaction icon at the interaction presentation position corresponding to the target virtual object.

* * * * *